US007890881B1

(12) United States Patent
Skidgel

(10) Patent No.: US 7,890,881 B1
(45) Date of Patent: Feb. 15, 2011

(54) SYSTEMS AND METHODS FOR A FOLD PREVIEW

(75) Inventor: John Skidgel, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 483 days.

(21) Appl. No.: 11/193,319

(22) Filed: Jul. 29, 2005

(51) Int. Cl.
*G06F 3/048* (2006.01)

(52) U.S. Cl. ............ 715/788; 715/243; 715/244; 715/247; 715/252; 715/253; 715/274; 715/790; 715/792; 715/798; 715/801

(58) Field of Classification Search ......... 715/778, 715/243–253, 274, 788–801
See application file for complete search history.

(56) References Cited

U.S. PATENT DOCUMENTS

| | | | | |
|---|---|---|---|---|
| 5,283,560 A | * | 2/1994 | Bartlett ............... | 715/729 |
| 5,430,832 A | * | 7/1995 | Imaizumi et al. ...... | 345/620 |
| 5,487,141 A | * | 1/1996 | Cain et al. ........... | 715/764 |
| 5,517,209 A | * | 5/1996 | Holland et al. ....... | 715/788 |
| 5,638,501 A | * | 6/1997 | Gough et al. ......... | 345/639 |
| 5,651,107 A | * | 7/1997 | Frank et al. .......... | 715/768 |
| 5,689,666 A | * | 11/1997 | Berquist et al. ....... | 715/797 |
| 5,739,930 A | * | 4/1998 | Sato et al. ........... | 359/23 |
| 5,745,910 A | * | 4/1998 | Piersol et al. ........ | 715/210 |
| 5,805,163 A | * | 9/1998 | Bagnas ............... | 715/768 |
| 5,873,106 A | * | 2/1999 | Joseph ............... | 715/203 |
| 5,896,131 A | * | 4/1999 | Alexander ........... | 345/634 |
| 5,949,432 A | * | 9/1999 | Gough et al. ......... | 345/629 |
| H1812 H | * | 11/1999 | Arcuri ............... | 345/428 |
| 5,999,191 A | * | 12/1999 | Frank et al. .......... | 345/634 |
| 6,072,489 A | * | 6/2000 | Gough et al. ......... | 715/803 |
| 6,091,395 A | * | 7/2000 | DeStefano ........... | 715/862 |
| 6,178,272 B1 | * | 1/2001 | Segman .............. | 382/298 |
| 6,223,183 B1 | * | 4/2001 | Smith et al. .......... | 707/102 |
| 6,246,407 B1 | * | 6/2001 | Wilks et al. .......... | 715/803 |
| 6,252,595 B1 | * | 6/2001 | Birmingham et al. ... | 715/803 |
| 6,278,434 B1 | * | 8/2001 | Hill et al. ........... | 345/660 |
| 6,310,603 B1 | * | 10/2001 | Nason et al. ......... | 715/856 |
| 6,337,703 B1 | * | 1/2002 | Konar et al. ......... | 715/858 |
| 6,356,281 B1 | * | 3/2002 | Isenman ............. | 345/629 |
| 6,359,617 B1 | * | 3/2002 | Xiong ............... | 715/848 |
| 6,369,830 B1 | * | 4/2002 | Brunner et al. ....... | 345/629 |
| 6,400,467 B1 | * | 6/2002 | Harrington .......... | 358/1.9 |
| 6,429,883 B1 | * | 8/2002 | Plow et al. .......... | 715/768 |
| 6,587,596 B1 | * | 7/2003 | Haeberli ............. | 382/283 |
| 6,597,373 B1 | * | 7/2003 | Singla et al. ......... | 345/698 |
| 6,661,435 B2 | * | 12/2003 | Nason et al. ......... | 715/778 |
| 6,694,487 B1 | * | 2/2004 | Ilsar ................. | 715/247 |
| 6,751,780 B1 | * | 6/2004 | Neff et al. ........... | 715/247 |
| 6,760,638 B1 | * | 7/2004 | Love et al. ........... | 700/98 |
| 6,806,892 B1 | * | 10/2004 | Plow et al. .......... | 715/781 |
| 6,874,131 B2 | * | 3/2005 | Blumberg ............ | 715/205 |

(Continued)

*Primary Examiner*—Weilun Lo
*Assistant Examiner*—Eric Wiener
(74) *Attorney, Agent, or Firm*—Kilpatrick Stockton LLP

(57) ABSTRACT

The invention comprises systems and methods for a fold preview. Various embodiments of the present invention provide a fold preview of a web page, including fixed-width and flexible-width web page designs. Other embodiments of the present invention provide a fold preview of any software application interface. In one exemplary embodiment, a method for providing a fold preview comprises calculating a cut-off region for one or more display resolutions, rendering one or more fold indicators, and continuing to display an area of a page falling within the cut-off region.

27 Claims, 4 Drawing Sheets

U.S. PATENT DOCUMENTS

| | | | |
|---|---|---|---|
| 6,961,029 B1 * | 11/2005 | Canova et al. | 345/55 |
| 7,055,092 B2 * | 5/2006 | Yardumian et al. | 715/234 |
| 7,065,716 B1 * | 6/2006 | Rzepkowski et al. | 715/839 |
| 7,110,605 B2 * | 9/2006 | Marcellin et al. | 382/232 |
| 7,120,868 B2 * | 10/2006 | Salesin et al. | 715/249 |
| 7,212,218 B2 * | 5/2007 | Suzuki et al. | 345/660 |
| 7,272,789 B2 * | 9/2007 | O'Brien | 715/247 |
| 7,324,072 B1 * | 1/2008 | Canova et al. | 345/55 |
| 7,356,760 B2 * | 4/2008 | Jaeger | 715/246 |
| 7,362,338 B1 * | 4/2008 | Gettemy et al. | 345/629 |
| 7,401,289 B2 * | 7/2008 | Lachhwani et al. | 715/243 |
| 7,425,970 B1 * | 9/2008 | Gettemy et al. | 345/698 |
| 7,500,182 B2 * | 3/2009 | Kelly | 715/234 |
| 7,500,183 B2 * | 3/2009 | Kelly | 715/234 |
| 7,629,945 B2 * | 12/2009 | Baudisch | 345/1.3 |
| 2002/0073123 A1 * | 6/2002 | Tsai | 707/526 |
| 2002/0163545 A1 * | 11/2002 | Hii | 345/838 |
| 2003/0103227 A1 * | 6/2003 | Tomomatsu | 358/1.13 |
| 2003/0167447 A1 * | 9/2003 | Hatta et al. | 715/517 |
| 2003/0202211 A1 * | 10/2003 | Yudasaka et al. | 358/1.18 |
| 2005/0034068 A1 * | 2/2005 | Jaeger | 715/517 |
| 2005/0091606 A1 * | 4/2005 | Sauermann | 715/788 |
| 2005/0251754 A1 * | 11/2005 | Padgett et al. | 715/779 |
| 2005/0268248 A1 * | 12/2005 | Boerner et al. | 715/788 |
| 2006/0069988 A1 * | 3/2006 | Bailey | 715/521 |
| 2006/0152758 A1 * | 7/2006 | Owen | 358/1.15 |

* cited by examiner

SYSTEMS AND METHODS FOR A FOLD PREVIEW

TECHNICAL FIELD

The present invention relates, in general, to web page design and, more specifically, to systems and methods for a fold preview.

BACKGROUND OF THE INVENTION

Web authoring tools allow a developer (e.g., a web developer) to create web pages, websites, interactive applications, and the like for use by end users (e.g., visitors to websites). Various such tools currently exist in the marketplace, including DREAMWEAVERT™ and FLEX BUILDER™, both available from MACROMEDIA INC. of San Francisco, Calif. DREAMWEAVER™, for example, allows web developers to design Hypertext Markup Language (HTML) web pages in both a code editor and in a graphical environment. FLEX BUILDER™ is an integrated development environment (IDE) that allows designers to produce Rich Internet Applications (RIA) operable through the FLEX™ presentation server.

Generally, a web page is constrained by the size of the screen that displays it. Whether the web page has been intended for display on a television screen, cell phone or web browser, its contents typically fit within a given pixel area (e.g., 640×480 pixels, 800×600 pixels, 1024×768 pixels, and so on). Therefore, designers typically wish to know where content can be placed on the page in order to be viewable within the display window. For example, if a browser window is sized at 800×600 pixels, any content originally arranged beyond a maximum horizontal length of 800 pixels or a maximum vertical length of 600 pixels will not show in the end user's browser window without the user scrolling up or down, or side-to-side. In other words, the web page "folds" at the edges of the window, and any content placed beyond those edges gets cut off.

Some current web page authoring tools have attempted to actually resize the workspace, pane, or window during the design process, as if it were a browser window, so as to give the designer a preview of the page. Other current solutions included creating the entire web page, taking a screenshot of it, measuring the desired number of pixels along the page, and drawing a line by hand that showed the position of the fold. More recently, some tools have also included rulers and guides, so that a developer may scroll down the page, use the ruler to mark the page at a desired measure, and then drag a guide at that location, thereby indicating the position of a fold. Unfortunately, such solutions add several steps to the design process, making it more cumbersome and increasing costs.

BRIEF SUMMARY OF THE INVENTION

The present invention is directed to systems and methods that provide a fold preview. Various embodiments of the present invention provide a fold preview of a web page, including fixed-width and flexible-width web page designs. Other embodiments of the present invention provide a fold preview of any software application interface. As used herein, the term "fold" includes any region of a web page or application interface that gets cut off beyond the edges or boundaries of the screen and/or window that displays it. Accordingly, a web designer may utilize the fold preview, for example, to aid in the design of a web page so that properly fits within a browser window's size or resolution. The fold preview of the present invention may allow a designer to instantaneously adjust and simultaneously preview various fold indications of a page without requiring a separate viewing window. Moreover, the fold preview of the present invention may indicate where a particular fold is, while still allowing the designer to see the cut-off region of the page.

A designer may utilize various means to activate the fold preview. In an exemplary embodiment, the fold preview may transparently or translucently cover a cut-off region of a page, thereby making the cut-off content visible to the designer so as to give him or her context and continuity when designing the page under the client's specifications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
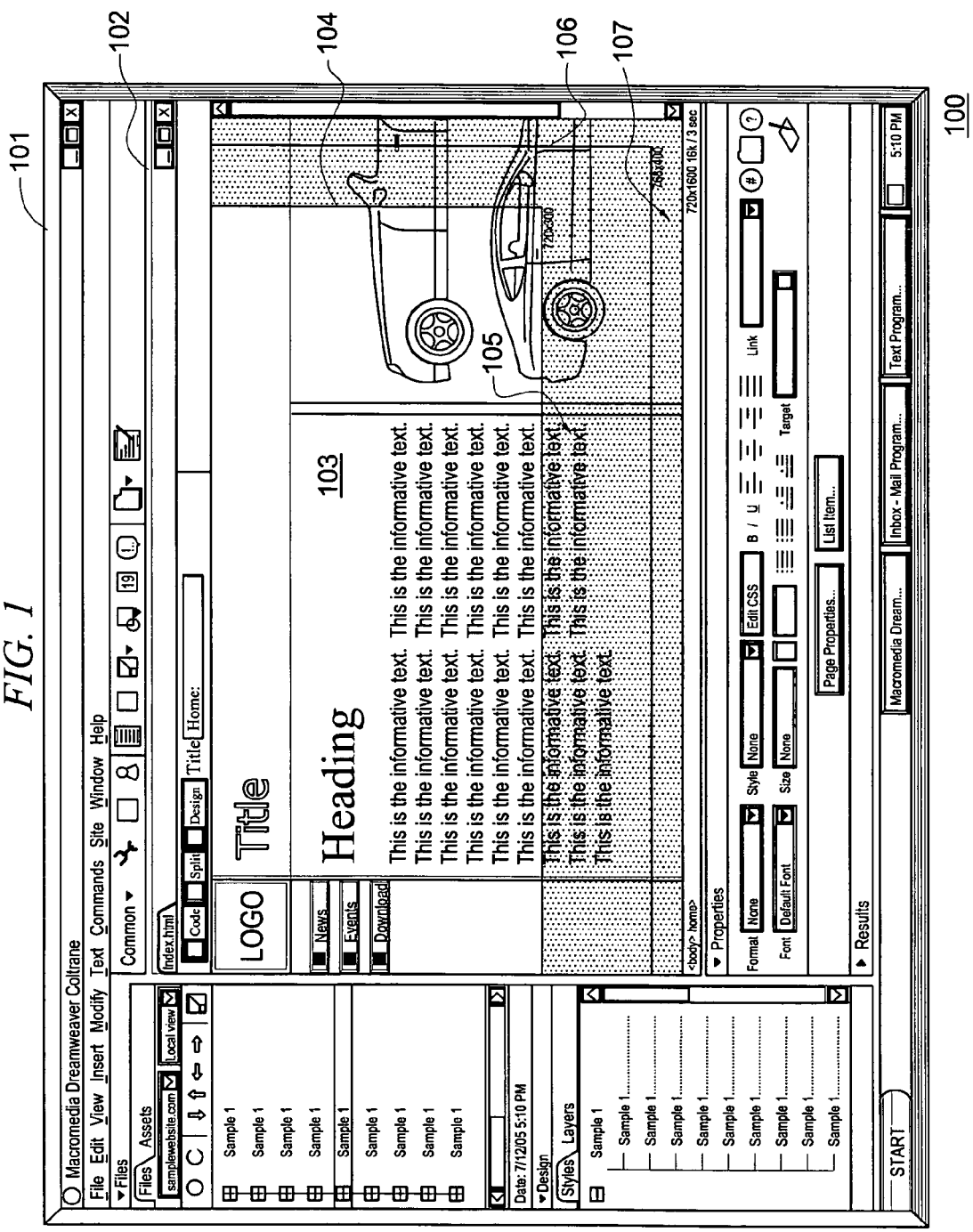
FIG. 1 is a screenshot illustrating a web authoring application applying a fold preview in fixed-width mode, adapted according to one embodiment of the present invention.

FIG. 1 is screenshot 100 illustrating web authoring application 101 applying a fold preview in fixed-width mode, adapted according to one embodiment of the present invention. Application 101 includes design pane 102 that displays page 103 and that allows a designer to edit and preview page 103. In one embodiment, page 103 may be a fixed-width web page design. In another embodiment, page 103 may be a fixed-width software application interface. For example, application 101 may indicate first fold 104 of page 103 and second fold 106 of page 103, where first fold 104 may be at a 720×300 pixel resolution and second fold 106 may be at a 768×400 pixel resolution. In this example, application 101 may display first cut-off region 105 of page 103 (resulting from first fold 104) and second cut-off region 107 of page 103 (resulting from second fold 106).

The fold preview of the present invention may provide a shaded display of cut-off regions 105 and/or 107. For example, shading may be achieved by applying a transparency or translucency to cut-off regions 105 and/or 107. Alternatively, shading may be achieved by applying a colored transparency, or even solid colors, to cut-off regions 105 and/or 107. The present invention may allow a designer to choose the degree of transparency and/or color of each transparency being applied to each of cut-off regions 105 and 107. The fold preview of the present invention may also provide a plurality of folds, where each fold may have a different size or resolution. In one embodiment, fold sizes or resolutions are preset at standard display specifications. In another embodiment, fold sizes or resolutions are customizable or configurable by the designer.

A fold preview according to embodiments of the present invention may provide an overlay mode that gives a designer the ability to see where folds are while still displaying the cut-off regions of a page. As a person of ordinary skill in the art will recognize in light of this disclosure, the present invention may provide fold previews in fixed-width, flexible-width, and custom modes. In fixed mode, the overlay preview may show a fold indication and where the page is cut-off. In flexible mode, the overlay preview may show the fold indication and how the page flows into a new screen size (i.e., some of the content may be resized or rearranged, instead of being cut-off). For example, in the case of a flexible-width design, when a visitor increases the size of the browser window it shows more page content, and when the visitor decreases the size of the window it shows less page content. Finally, in custom mode, the designer may define his or her own overlay preview.

Figure 2:
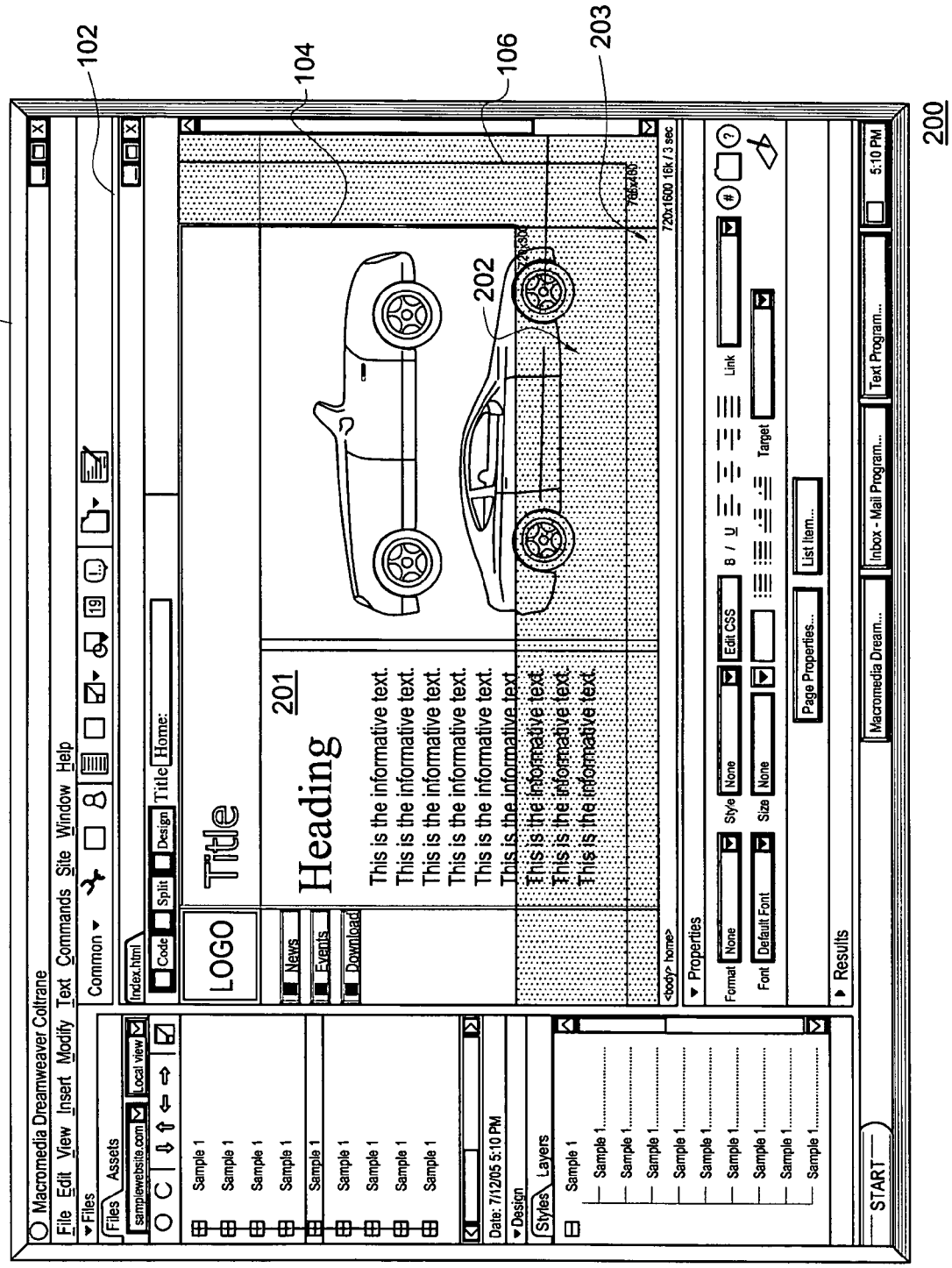
FIG. 2 is a screenshot illustrating a web authoring application applying a fold preview in flexible width mode, adapted according to one embodiment of the present invention.

FIG. 2 is screenshot 200 illustrating web authoring application 101 applying a fold preview in flexible width mode, adapted according to one embodiment of the present invention. Application 101 includes design pane 102 that displays page 201 and that allows a designer to edit and preview page 201. In one embodiment, page 201 may be a flexible-width web page design. In another embodiment, page 201 may be a flexible-width software application interface. As shown in FIG. 2, some of the content of page 201 may be rearranged and/or resized in order to minimize the content being cut-off in cut-off regions 202 and 203. For example, application 101 may indicate a first fold 104 of page 201 and a second fold 106 of page 201, where first fold 104 may be at a 720×300 pixel resolution and second fold 106 may be at a 768×400 pixel resolution. In this example, application 101 may display a first cut-off region 202 of page 201 (resulting from first fold 104) and a second cut-off region 203 of page 201 (resulting from second fold 106).

Figure 3:
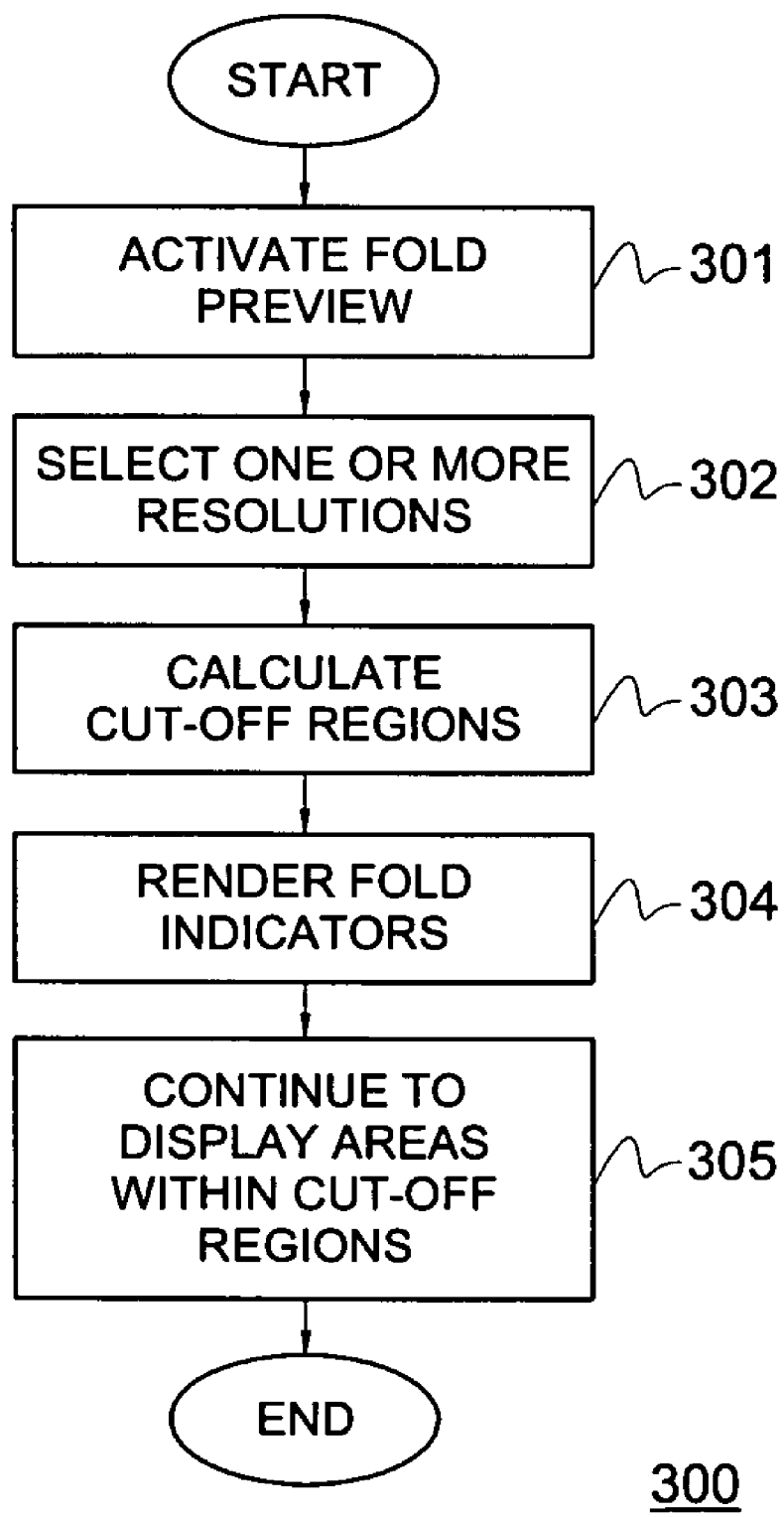
FIG. 3 is a flowchart illustrating example steps executed in implementing one embodiment of the present invention.

FIG. 3 is flowchart 300 illustrating example steps executed in implementing one embodiment of the present invention. In step 301, a fold preview feature of an application is activated. In step 302, one or more custom or preset screen resolutions are selected. Selecting a resolution may include, for example, selecting a fold indicator, moving a mouse or other device over a fold resolution in order to snap the page to it, using a keyboard or mouse to toggle the fold preview on and off at specific resolutions, or using a drop-down menu or pop-up window. The application calculates the cut-off regions in step 303. The application then renders, in step 304, the fold indicators. In step 305, the application displays areas of the page falling within the cut-off regions. In one embodiment, the cut-off regions are displayed as shaded areas.

The systems and methods of the present invention may be carried out, for example, via a computer program. The computer program may have a computer readable medium with computer program logic recorded thereon for implementing a fold preview, where the computer program includes code for calculating a cut-off region for one or more display resolutions, code for rendering said one or more fold indicators responsive to said calculating, and code for displaying an area of a page in said application development environment falling within said cut-off region.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 4:
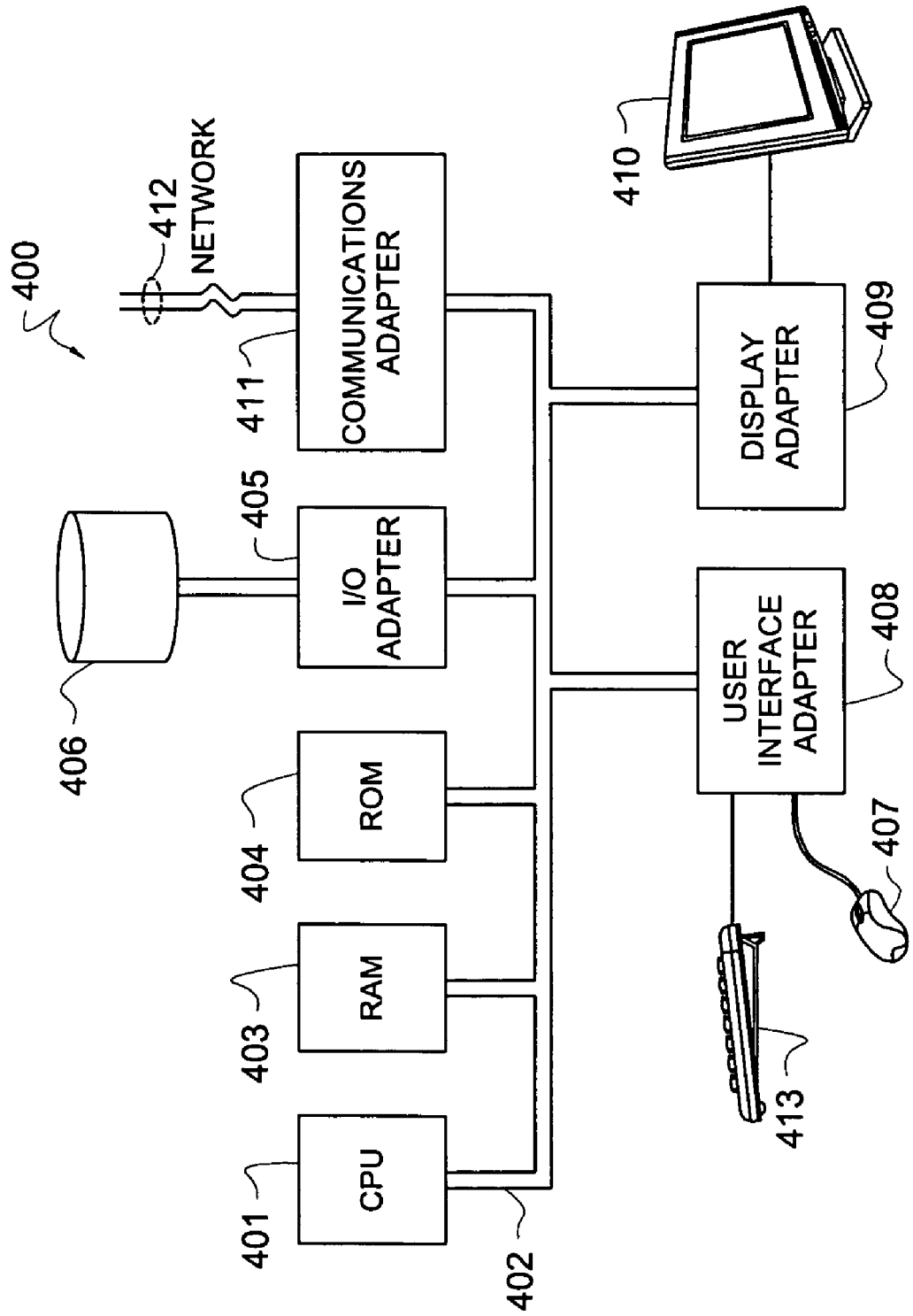
FIG. 4 is a block diagram illustrating a computer system adapted according to various embodiments of the present invention.

FIG. 4 is a block diagram illustrating computer system 400 adapted according to various embodiments of the present invention. Central processing unit (CPU) 401 is coupled to system bus 402. The CPU 401 may be any general purpose CPU. However, embodiments of the present invention are not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects storage devices 406, such as one or more of a hard drive, a CD drive, a floppy disk drive, a tape drive, to computer system 400. The I/O adapter 405 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 411 is adapted to couple the computer system 400 to a network 412, which may be one or more of a telephone network, a local (LAN) and/or a wide-area (WAN) network, an Ethernet network, and/or the Internet network. User interface card 408 couples user input devices, such as keyboard 413, pointing device 407, and the like, to the computer system 400. The display card 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:

calculating, in an application development environment (ADE), a first cut-off region of a page corresponding to a first display resolution and a second cut-off region of the page corresponding to a second display resolution, wherein the first display resolution is different than the second display resolution and the first cut-off region is different than the second cut-off region;

rendering a first fold indicator on said page responsive to said calculating, the first fold indicator indicating the first cut-off region;

rendering a second fold indicator on said page responsive to said calculating, the second fold indicator indicating the second cut-off region; and continuing to display a first area of said page in said ADE falling within said first cut-off region and a second area of said page in said ADE falling within said second cut-off region.

2. The method of claim 1, wherein said page comprises one of:
   a web page; and
   a software application interface.

3. The method of claim 1, wherein said page comprises one of:
   a fixed-width page; and
   a flexible-width page.

4. The method of claim 1, wherein continuing to display said first area of said page includes shading said first cut-off region.

5. The method of claim 4, wherein shading the first cut-off region includes transparently shading said first cut-off region.

6. The method of claim 4, wherein shading said first cut-off region includes applying a color to said first cut-off region.

7. The method of claim 1, wherein said first display resolution comprising one of:
   a preset resolution; and
   a custom resolution.

8. The method of claim 1, wherein said first display resolution comprises a first viewing window size, and wherein said first fold indicator provides an indication of said first cut-off region, said first cut-off region representing an area of said page that is cut off when said page is rendered on a display screen in a window corresponding to said first viewing window size.

9. The method of claim 1 wherein said continuing to display comprises:
   displaying on a computer display device.

10. A computer program product having a computer readable storage medium having computer program logic recorded thereon, said computer program product comprising:

code, executable in an application development environment (ADE), for calculating, in an application development environment (ADE), a first cut-off region of a page corresponding to a first display resolution and a second cut-off region of the page corresponding to a second display resolution, wherein the first display resolution is different than the second display resolution and the first cut-off region is different than the second cut-off region;

code, executable in said ADE, for rendering a first fold indicator on said page responsive to said calculating, the first fold indicator indicating the first cut-off region;

code, executable in said ADE, for rendering a second fold indicator on said page responsive to said calculating, the second fold indicator indicating the second cut-off region; and code for continuing to display a first area of said page in said ADE falling within said first cut-off region and a second area of said page in said ADE falling within said second cut-off region.

11. The computer program product of claim 10, wherein said page comprises one of:
   a web page; and
   a software application interface.

12. The computer program product of claim 10, wherein said page comprises one of:
   a fixed-width page; and
   a flexible-width page.

13. The computer program product of claim 10, wherein continuing to display said first area of said page includes shading said first cut-off region.

14. The computer program product of claim 13, wherein shading said first cut-off region includes transparently shading said first cut-off region.

15. The computer program product of claim 13, wherein shading said first cut-off region includes applying a color to said first cut-off region.

16. The computer program product of claim 10, wherein said first display resolution comprising one of:
   a preset resolution; and
   a custom resolution.

17. The computer program product of claim 10, wherein said first display resolution comprises a first viewing window size, and wherein said first fold indicator provides an indication of said first cut-off region, said first cut-off region representing an area of said page that is cut off when said page is rendered on a display screen in a window corresponding to said first viewing window size.

18. The computer program product of claim 10 wherein said continuing to display comprises:
   displaying on a computer display device.

19. A computer implemented system including a display device comprising: means, operable in an application development environment (ADE), for calculating a first cut-off region of a page corresponding to a first display resolution and a second cut-off region of the page corresponding to a second display resolution, wherein first display resolution is different than the second display resolution and the first cut-off region is different than the second cut-off region; means, operable in said ADE, for rendering a first fold indicator on said page responsive to said calculating, the first fold indicator indicating the first cut-off region means, operable in said ADE, for rendering a second fold indicator on said page responsive to said calculating, the second fold indicator indicating the second cut-off region; and means for continuing to display a first area of said page in said ADE falling within said first cut-off region and a second area of said page in said ADE falling within said second cut-off region.

20. The system of claim 19, wherein said page comprises one of:
   web page; and
   a software application interface.

21. The system of claim 19, wherein said page comprises one of:
   a fixed-width page; and
   a flexible-width page.

22. The system of claim 19, wherein continuing to display said first area of said page includes shading said first cut-off region.

23. The system of claim 22, wherein shading said first cut-off region includes transparently shading said first cut-off region.

24. The system of claim 22, wherein shading said first cut-off region includes applying a color to said first cut-off region.

25. The system of claim 19, wherein said first said first display resolution comprising one of:
   a preset resolution; and
   a custom resolution.

26. The system of claim 19, wherein said first display resolution comprises a first viewing window size, and wherein said first fold indicator provides an indication of said first cut-off region, said first cut-off region representing an area of said page that is cut off when said page is rendered on a display screen in a window corresponding to said first viewing window size.

27. The system of claim 19 wherein said means for continuing to display comprises:
   a computer display device.

* * * * *

UNITED STATES PATENT AND TRADEMARK OFFICE
CERTIFICATE OF CORRECTION

| | | |
|---|---|---|
| PATENT NO. | : 7,890,881 B1 | |
| APPLICATION NO. | : 11/193319 | |
| DATED | : February 15, 2011 | |
| INVENTOR(S) | : John Skidgel | |

It is certified that error appears in the above-identified patent and that said Letters Patent is hereby corrected as shown below:

Column 7, line 14
(Claim 25, line 1)
Delete second occurrence of "said first"

Signed and Sealed this
Third Day of May, 2011

David J. Kappos
*Director of the United States Patent and Trademark Office*